United States Patent [19]
Lambert

[11] Patent Number: 5,536,281
[45] Date of Patent: Jul. 16, 1996

[54] METHOD AND APPARATUS FOR MANIPULATING SUBSTRATE HAVING A PLANT INCORPORATED THEREIN

[75] Inventor: Flier Lambert, Barendrecht, Netherlands

[73] Assignee: Machinefabriek Flier B.V., Barendrecht, Netherlands

[21] Appl. No.: 355,052

[22] Filed: Dec. 13, 1994

[30] Foreign Application Priority Data

Dec. 13, 1993 [NL] Netherlands ............................ 9302172

[51] Int. Cl.⁶ ............................ A01C 11/02; B65G 47/90
[52] U.S. Cl. ............................ 47/1.01; 111/104; 47/901
[58] Field of Search ............................ 47/1 A, 901, 1.01; 111/104, 105; 172/22, 378–381

[56] References Cited

U.S. PATENT DOCUMENTS

| | | | |
|---|---|---|---|
| 4,947,529 | 8/1990 | Harrison | 111/105 |
| 5,247,761 | 9/1993 | Miles | 47/1 A |
| 5,320,649 | 6/1994 | Holland | 47/1 A |
| 5,353,723 | 10/1994 | Tesch | 111/105 |

FOREIGN PATENT DOCUMENTS

| | | | |
|---|---|---|---|
| 288873 | 11/1988 | European Pat. Off. | 47/1 A |
| 0422704 | 4/1991 | European Pat. Off. | |
| 486481 | 5/1992 | European Pat. Off. | 47/1 A |
| 0551232 | 7/1993 | European Pat. Off. | |
| 7900943 | 8/1980 | Netherlands . | |
| 86/01975 | 10/1986 | WIPO . | |
| 92/05684 | 4/1992 | WIPO . | |

*Primary Examiner*—Henry E. Raduazo
*Attorney, Agent, or Firm*—Brumbaugh, Graves, Donohue & Raymond

[57] ABSTRACT

The invention relates to a method for picking up and delivering a plug of substrate having a plant incorporated therein, wherein the plug is seized at least from the top side by means of a number of needles and is taken from a tray or a like device by at least a vertical movement, and the plug can be delivered by moving the needles out of the plug, with the needles being stuck into the plug substantially vertically such that the plug can thereby be seized, whereupon the needles are moved upward relative to the tray while taking along the plug from the tray, in such a manner that the needles move substantially parallel to each other relative to the plug, and to an apparatus for using such method.

11 Claims, 2 Drawing Sheets

METHOD AND APPARATUS FOR MANIPULATING SUBSTRATE HAVING A PLANT INCORPORATED THEREIN

The invention relates to a method for picking up and delivering a plug of substrate having a plant incorporated therein, wherein the plug is seized at least from the top side by means of a number of needles and is taken from a tray or a like device by at least a vertical movement, and the plug can be delivered by moving the needles out of the plug. Such a method is known from Dutch patent specification EP-NL 197 976.

During the transfer of plants, in particular during the pricking out thereof, seedlings, closely spaced in an advancing tray, together with the plug of substrate wherein they are incorporated, such as for instance a ball of soil or a tuft of mineral wool or Oasis, are taken from the advancing tray and transferred into larger pots, for instance soil blocks or different trays, with the plant being spaced more widely apart so as to be able to properly develop into adult plants. A well-known problem involved in this pricking out is the reliable seizure of these delicate seedlings without damaging the plants, while a sufficiently high transfer rate should nevertheless be realized for economic reasons.

In the known method, the seedlings are introduced, for instance in trays, into an apparatus, wherein from the top side at least two thin needles are obliquely stuck under the seedling from the edge of a plug. Subsequently, the needles, mounted on a movable frame, are simultaneously moved upward vertically, so that the plug together with the seedling incorporated therein are removed from the tray and can be transferred.

The needles are thin and are obliquely stuck into the plug, which prevents the needles from damaging the seedling. Because seedlings are received in relatively small recesses, and hence small, closely spaced plugs in a tray, the needles and in particular the needle holders in the known method will extend at least largely above the plugs adjacent to the plug to be seized, especially if the plugs are simultaneously seized by more than two symmetrically disposed needles. Moreover, the position of the needles should be adjusted in each case when trays of different sizes are used, to obtain a proper seizing direction and insertion depth.

Due to the fact that the seedlings in a tray are closely spaced, the leaves of the seedlings will commonly reach at least partly over the edge of adjacent plugs. As a consequence, in the known method, when being stuck into the plug to be seized, the needles will commonly be stuck through the leaves of seedlings received in adjacent plugs. This at least results in those seedlings being damaged, but moreover considerably hampers the picking up of the plug, and, in addition, there is a risk that the seized plug will tilt about the needles or tear along one or more of the needles.

Hence, the object of the invention is to provide a method of the type described in the opening paragraph, wherein the drawbacks mentioned are avoided while the advantages thereof are maintained. To that end, the method according to the invention is characterized in that the needles are stuck into the plug substantially vertically such that the plug can thereby be seized, whereupon the needles are moved upward relative to the tray while taking along the plug from the tray, in such a manner that the needles move substantially parallel to each other relative to the plug.

Because the needles are stuck into the plug at least practically parallel to each other and substantially vertically, the chance that the needles are stuck through leaves of adjacent seedlings is considerably reduced. Moreover, as prior to and during the seizing of the plug, the needles extend only within an area located above the plug, a large number of juxtaposed plugs can simultaneously be seized, irrespective of the size of the plug and the number of needles used, without the needles or needle holders being hindered by adjacent needles or needle holders. In addition, the method according to the invention has the advantage that due to the vertical arrangement of the needles, in the case where vertically upward or downward directed forces are applied to the plug, the plug will not tear along the needles as will often be the case with the known method.

In accordance with a preferred embodiment of the method according to the invention, at least three and preferably four needles are stuck into the plug next to a stem of a plant incorporated into the plug, at a relatively small mutual distance relative to the horizontal section of the plug.

By sticking three or four needles into the plug, a stable and positionally fixed grip of the plug is obtained in a simple manner, without this requiring any further measures. Because the needles are stuck close to the stem of the plant received in the plug, the chance that the needles are stuck through leaves of adjacent plants is even further reduced, and, moreover, the advantage is reached that the same configuration of the needles can be used for plugs of different dimensions, so that if the type and dimensions of the trays that are used are changed, the number of required adjusting operations is reduced considerably.

In particular in the case of plants that have a wide foliage relative to the size of the plug, even the use of the needles that are vertically movably arranged in accordance with the invention still involves a chance, although small, that one of the needles is stuck through a leaf of the plant or of an adjacent plant. For this reason, in a further elaboration of the method according to the invention, before the needles are stuck into the plug, plant parts projecting above the plug are moved practically horizontally in the direction of one side of the tray, such that these parts are brought substantially outside the reach of the needles.

In a particularly advantageous embodiment of the method, wherein a number of plugs arranged side by side in a row are simultaneously seized and picked up, in accordance with the invention, the mutual distance between the plugs is increased after the picking up and the plugs are moved above a receiving device, such as for instance a series of soil blocks, and pressed into the growth medium present therein, after which, finally, the needles are moved out of the plugs while the plugs are left behind in the receiving device.

The invention moreover relates to a plant-transferring device provided with feed means for plugs and with pick-up means for seizing, from the top side, a plug having a plant incorporated therein from for instance a tray or the like, and moving it at least in vertical direction, the pick-up means comprising a number of needles whose sharp sides point downwards, which apparatus according to the invention is characterized in that the needles are arranged substantially vertically.

In a further elaboration of the apparatus according to the invention, plant-flattening means are provided, arranged before the needles, viewed in the direction of movement of the feed means, which plant-flattening means are preferably formed by a sweeping strip movable at least in vertical direction, whose bottom side can be moved to a position approximately flush with the top side of each plug fed via the feed means. When a tray with plants received therein is fed by the feed means, plant parts projecting above the plug, such as for instance the leaves, are automatically pushed in opposite direction flat against the plug by the sweeping strip, so that the larger part of the top side of the plug under the needles is free from covering and the needles can hence be moved into the plug without damaging the plant. In a particularly advantageous embodiment, the sweeping strip is a brush, so that damage to the seedlings is prevented in a simple manner.

The plant-transferring apparatus according to the invention is preferably provided with a plug retainer movable along the needles, which plug retainer comprises, at the bottom side thereof, a substantially horizontally extending abutting face and is movable between a top position wherein the needles substantially extend below the retainer, and a bottom position wherein the abutting face is located close to the sharp ends of the needles. When the needles are moved out of the plug, the plug is held in place in the pot or the like by the plug retainer, the plug retainer having the additional advangtage that the plug can thereby be pressed into the growth medium, so that the plug can be provided therein without prior provision of preformed recesses in the growth medium in the pot by means of a special device.

In a further elaboration of the plant-transferring apparatus according to the invention, the needles are fixedly accommodated in a substantially tubular needle holder, the plug retainer being mounted on a shaft extending through the needle holder, which shaft is movable relative thereto with friction, the abutting face having two parts including an angle and extending at a distance from the center line of the needle holder. In this manner, the construction of the apparatus can be compact and simple, with the special shape and positioning of the plug retainer moreover preventing it from pressing on the plant when the plug is being retained.

To explain the invention, an exemplary embodiment of the method and apparatus will be described hereinbelow, with reference to the accompanying drawings. In these drawings.

FIG. 4A, FIG. 4B, FIG. 4C, and FIG. 4D show in four successive steps the picking-up operation of a plug in accordance with a method according to the invention, in side view; and FIG. 5A, FIG. 5B, FIG. 5C, and FIG. 5D show in four successive steps the delivery of a plug in accordance with a method according to the invention, in side view.

Figure 1:
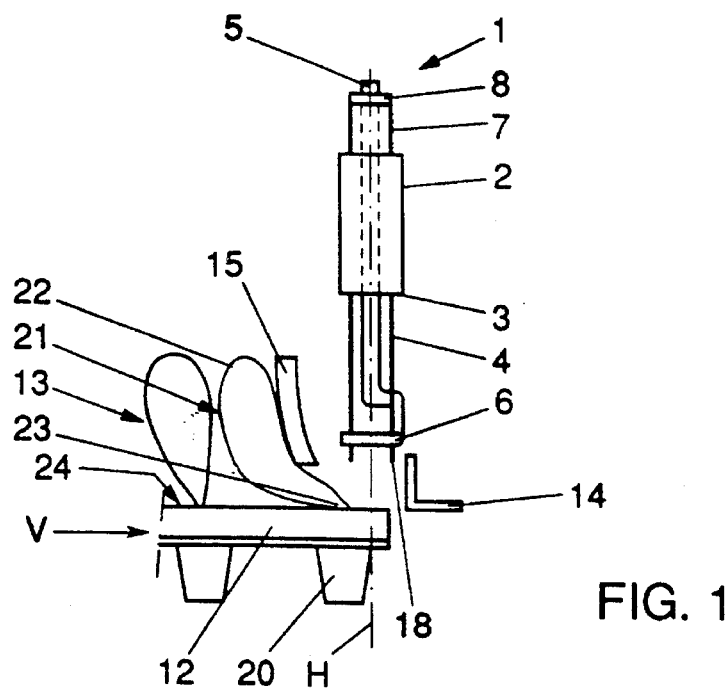
FIG. 1 shows a pick-up means according to the invention, in a sectional side elevation, with associated sweeping strip and push-out element and a tray with plants that is being fed.
Figure 2:
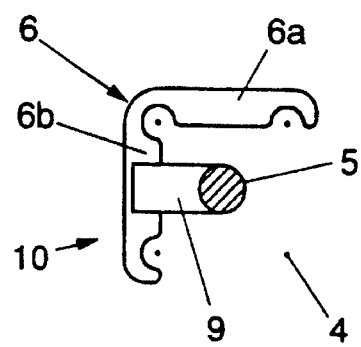
FIG. 2 is a top plan view of a plug retainer according to FIG. 1, with needle positions indicated.

The pick-up means 1 shown in FIGS. 1 and 2 comprises a tubular needle holder 2, arranged so as to be substantially vertically movable and comprising, at its bottom side 3, four needles 4 extending parallel to the center line H of the needle holder 2 and distributed symmetrically relative thereto. The needles are provided at a relatively small distance from the center line H. Extending through the needle holder 2 is a shaft 5 which has at its bottom end an abutting face 6 and is movable in the longitudinal direction relative to the needle holder 2 and the needles 4. At the top side of the needle holder 2, a clamp 7 is provided, with which a frictional force can be transmitted to the shaft 5 such that the shaft 5 can only be moved while controlled by the needle holder 2. Moreover, the shaft is at the top end provided with a clamping ring 8, limiting the vertical movement of the shaft 5 downwards.

The abutting face 6 is connected to the shaft 5 by a part 9, bent such that when the shaft 5 moves upward, the bent part 9 abuts against the bottom side 3 of the needle holder 2. In this manner, the vertical movement of the shaft 5 upwards is limited, while the space between the needles 4 from the bottom side remains clear over a considerable height. The distance, thus limited by the clamping ring 8 and the bent part 9, through which the shaft 5, and accordingly the abutting face 6, can move in vertical direction approximately corresponds to the distance through which the needles 4 during use can be moved into the substrate in vertical direction.

Figure 3:
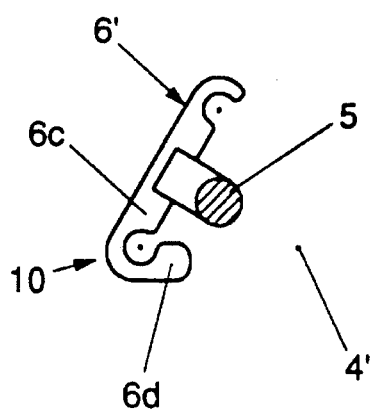
FIG. 3 is a top plan view of an alternative embodiment of a plug retainer according to the invention, with needle positions indicated.

As shown in FIG. 2, the abutting face 6 is angle-shaped, with two angle parts 6a and 6b each extending along a side of the square defined by the four needles 4 along the outside of the needles 4. The bent part 9 is mounted on one of the two angle parts 6a or 6b and extends at least partly between two juxtaposed needles 4. In FIG. 3, a comparable pick-up means 1' is shown in bottom view, with the arrangement of only three needles 4' and the angle parts 6c and 6d of the abutting face 6' extending along two sides of the triangle defined by the three needles 4'. It is further noted that in a comparable manner, a larger number of needles and differently shaped abutting faces can be used as well within the scope of the invention.

The shaft 5, the bent part 9 and the abutting face 6, 6' together form a plug retainer 10.

Provided at some distance below the pick-up means 1 is a push-out pin 11, whose center line coincides with the center line H of the needle holder 2. The push-out pin 11 can move vertically through approximately the same distance through which the needle holder 2 can move, and the movements of the needle holder 2 and the push-out pin 11 can be synchronized. The distance between a needle holder 2 moved into an extreme top position and a push-out pin 11 moved into an extreme bottom position is such that a tray 12 with a plug 20, coming from the tray 12 and held above it, can be moved between them. As a matter of fact, this distance can be set in an obvious manner, not shown in the drawing.

Viewed in the feed direction V of the tray 12 with plant 13 (in FIGS. 1 and 4A, 4B, 4C, and 4D from left to right), a sweeping strip 15 is arranged at some distance upstream of the center line H of the needle holder 2, arranged so that from an operating position, it can be swung away upward and opposite to the feed direction V of the tray 12. In the operation position, the bottom side 16 of the sweeping strip 15 is approximately flush with or slightly lower than the top face 24 of the tray 12, and can be slightly pushed aside at least in the feed direction V of the tray 12. Preferably, the sweeping strip 15 is constructed as a brush.

Viewed in the feed direction V of the tray 12 (in FIGS. 1 and 4A, 4B, 4C, and 4D from left to right), a tray retainer 14 is provided at some distance downstream of the center line H of the needle holder 2, preventing at least a vertical movement of the tray 12. This tray retainer 14 may for instance be constructed as a guide rail or an angle section provided above the top face 24 of the tray 12.

With reference to the first through fourth steps shown in FIGS. 4A, 4B, 4C, and 4D respectively and the fifth through eighth steps shown in FIGS. 5A, 5B, 5C, and 5D respectively of a method according to the invention, the use of an apparatus according to the invention, in particular such as described hereinabove, will now be further explained.

In the first step (FIG. 4A), the needle holder 2 is moved into an extreme top position and the plug retainer 10 is brought into an extreme bottom position relative to the needle holder 2, such that the bottom side 17 of the abutting face 6 is approximately flush with the points 18 of each needle 4. The push-out pin 11 is moved into an extreme bottom position, as a result of which the space between the points 18 of the needles 4 and the top side 19 of the push-out pin 11 is at its largest.

A tray 12 containing plants 13, received in plugs 20, is passed in the feed direction V between the needles 4 and the push-out pin 11. During the feed, the sweeping strip 15 is passed by the tray 12 and the plants 13, whereby the parts 21 of the plants 13 that project above the plug 20, such as leaves 22 and a stem 23, are flattened in a direction opposite to the feed direction V such that the leaves 22 abut against the top face of the plug 20 substantially on the side remote from the pick-up means 1. Because the projecting plant parts 21 lie flat against the plug 20 on the rear side, viewed in the feed direction V of the tray 12, the surface of the plug 20 around the stem 23 is substantially free from covering, at least on the front and lateral sides. The tray 12 is fed through far enough for the stem to be vertically located straight and centrally under the plane included by the needles 4 and the tray 12 to abut against the tray retainer 14, without it projecting above the plug 20 to be seized.

In the second step (FIG. 4B), the needle holder 2, together with the plug retainer 10, is moved downward to reach the extreme bottom position, with the push-out pin 11 being held in the extreme bottom position and the needles 4 being inserted into the plug 20 to a maximum extent. The plug retainer 10 is moved against the free top face of the plug 20, one of the angle parts 6a–6d being located on the front side of the needles 4, while the shaft 5, and accordingly the entire plug retainer 10, is moved upward relative to the needle holder 2 against the frictional force exerted by the clamp 7 to reach the extreme top position. Preferably, the points 18 of the needles 4 are just within the plug 20 and the abutting face 6 remains in contact with the plug 20. Because one of the angle parts 6a–6d is located on the front side of the needles, the rear side of the plane included by the needles 4 is free, as far as the abutting face 6 is concerned, which prevents the abutting face 6 from pressing on the plant 21 that has just been pushed aside to that side, and in particular the leaves 22 and the stem 23, so that the delicate plant is prevented from being damaged by the plug retainer 10 or otherwise.

As the sweeping strip 15 is held in the operating position during this second step, the needles 4 are prevented from being stuck through the projecting parts 21 of the plant 13 when the needle holder 2 is being moved downward, no matter whether this plant is received in the plug 20 to be seized by the needles 4 or in an adjacent plug.

In the third step (FIG. 4C), the sweeping strip 15 is swung aside from the operating position into the position R. In this swung-aside position R, the sweeping strip is outside the vertical reach of the pick-up means 1 and the plug 20.

Figures 4A, 4B, 4C, 4D:
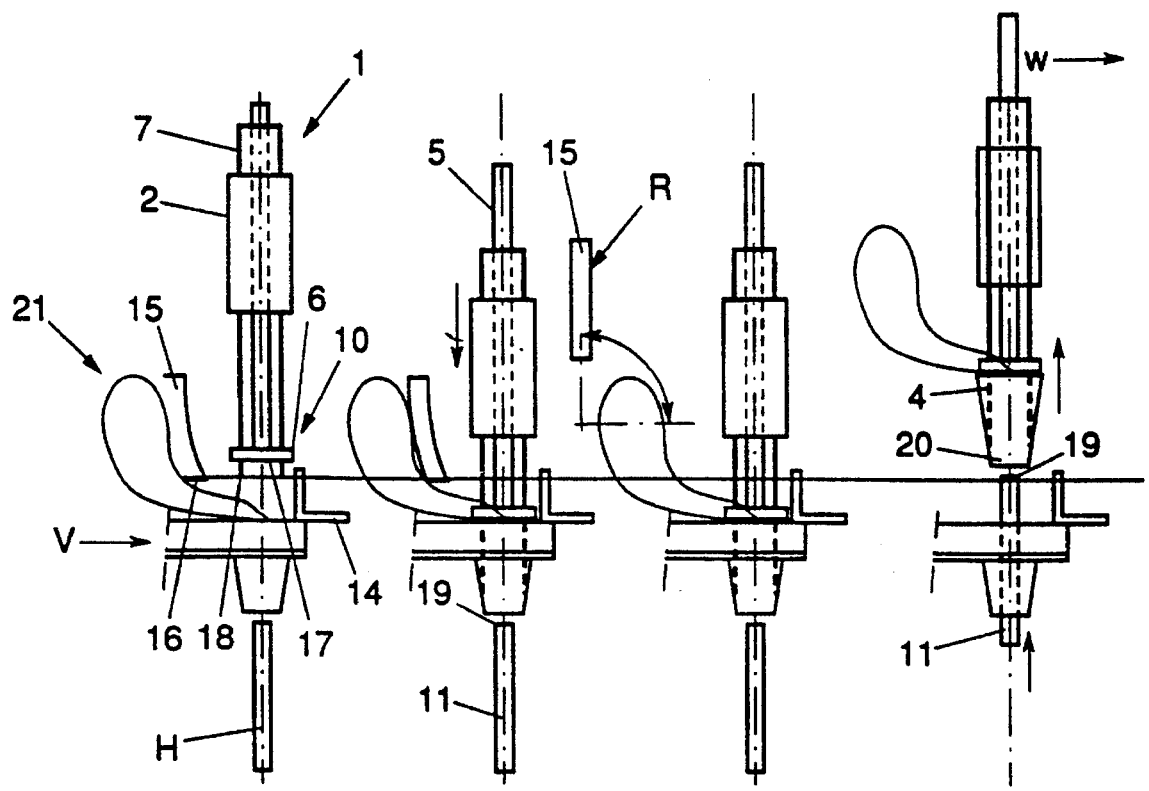
Figures 5A, 5B, 5C, 5D:
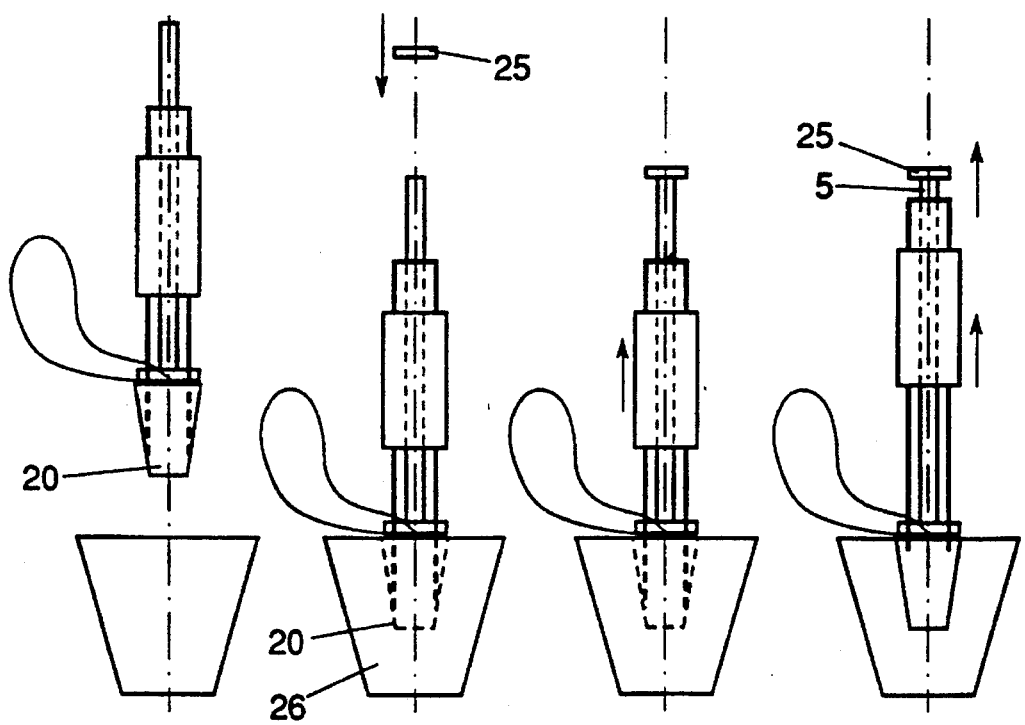

Subsequently, in the fourth step (FIG. 4D), the needle holder 2 is moved upward, simultaneously and synchronously with the push-out pin 11, into the extreme top position, and the plug 20, and hence also the plant 21, is lifted from the tray 12 to a position wherein the plug 20 is entirely free above the top face 24 of the tray 12, and other obstacles, if any, allowing the plug 20, suspended from the needles 4, to be moved away above the tray in horizontal direction, as indicated in FIG. 4D by the arrow W. Because the sweeping strip 15 has previously been swung aside (step 3), the projecting plant parts 21 are prevented from being damaged as yet by the sweeping strip.

In addition to the fourth and final pick-up steps, the pick-up means 1, together with the pendant plug 20, is in a fifth step (FIG. 5A, the first delivery step) maneuvered to another position within the apparatus, which involves the plug 20 being moved above a soil block 26 filled with a growth medium, such as for instance soil. The contents of the soil block 26 may or may not be provided with a preformed recess for the plug 20.

In the sixth step (FIG. 5B), the needle holder 2, together with the plug retainer 10 and the plug 20 suspended from the needles 4, is moved to an extreme bottom position, the plug 20 being pressed into the growth medium in the soil block 26. As the plug retainer 10 abuts against the part of the surface of the plug 20 that lies free from the plant 13, the plug is prevented from being slid on the needles 4 any further, because the bent part 9 abuts against the bottom side of the needle holder 2 and is hence in the extreme top position, and consequently, pressure can be applied to the plug 20 sufficient to insert the plug 20 into the soil block in a sufficiently fixed manner without damaging the delicate plant 13.

Because the needles 4 are passed into the plug substantially vertically during the pick-up steps, without penetrating the plant 13, the plant in the seized plug 20 or in other plugs is prevented from being damaged when the plug 20 is being moved away from the tray 12 and the adjacent plugs 20 present therein. Because three or four needles 4 have been stuck into the plug 20, the plug 20 can readily be removed from the tray 12 and pressed into the soil block 26 without involving the chance that the plug 20 will change position relative to the needles 4 or tear over the needles 4, due to external forces acting thereon, such as for instance pull forces on the leaves 22.

In the seventh step (FIG. 5C), a stop 25 is placed against the top side of the shaft 5, after which the needle holder 2 is moved upward. Because the stop 25 abuts against the shaft 5, the plug retainer 10 cannot move upward along with the needle holder 2, as a consequence of which the abutting face 6 remains abutting against the top side of the plug 20 and the needles 4 are moved out of the plug 20, while the plug 20 remains neatly seated in the soil block 26. Thus, the plug 20 and the plant 13 incorporated therein is in fact transferred without any damage and in an univocal and economical manner from a tray 12 to a soil block 26.

Subsequently, in the eighth step (FIG. 5D), the needle holder 2, together with the plug retainer 10, is moved further upward to reach the extreme top position, so that the pick-up means 1 is entirely released again from the plug 20 and can be moved back to the first position within the apparatus where the first step can be started again, while the soil block 26 with the undamaged delicate plant received therein can be discharged from the apparatus.

The method has been described on the basis of the transfer of one plug 20. It will be understood that a plant-transferring apparatus according to the invention can advantageously comprise a large number of pick-up means, disposed side by side in a row and moving synchronously. As in a horizontal projection, the needle holder 2, and accordingly the needles 4, and the plug retainer 10 do not project outside the contours of the plug 20, the pick-up means can be closely spaced, without the movements of the pick-up means being obstructed by adjacent pick-up means or plugs suspended therefrom.

In an embodiment of the apparatus not shown in the drawing, the pick-up means of a series (for instance 32) of juxtaposed pick-up means are alternately mounted on a first and second frame part, the frame parts being capable of moving independently of each other. Each frame part is constructed such that the pick-up means mounted thereon can be moved toward and away from each other, permitting the intermediate distance between the plugs suspended from the pick-up means to be adjusted to the trays that are used. With this apparatus, a series of closely spaced plugs can readily be distributed over a tray with recesses spaced more widely apart. For instance, a row of 32 juxtaposed plugs can be distributed over two rows, disposed one behind the other, of 16 recesses having an intermediate distance that is approximately twice as large.

The invention is by no means limited to the exemplary embodiments of a method and apparatuses according to the invention as shown in the drawing and specification. For instance, as the occasion arises, for instance when the plugs are loosely seated in the tray, the push-out pin can be dispensed with. Moreover, when the needles are moved into the plug, the needles, or at least the ends thereof, can be moved slightly toward or away from each other, for instance by means of a clamping part or clamping parts to be moved over the needles, as a result of which the intermediate distance between the needles is changed and the plug is clamped on the needles, permitting a greater vertical force to be transmitted to the plug, with the advantage that as the occasion arises, as in the case of light, small plugs, the push-out pin can be dispensed with. Also, in particular in the case of little-branched plants that grow straight upward, the plant-flattening means can be left out, because in that case, the needles can directly be stuck into the soil next to the stem.

Further, the abutting face can be designed in a large number of variant embodiments, whether or not adapted to a different number of needles to be used, while it is important that the abutting face extends substantially on the outside of the needles, leaving substantially clear at least the space between the needles located on the rear side and the space between the needles.

Moreover, in a series of juxtaposed pick-up means, the movements of each pick-up means can be controlled so as to be coupled to the movements of the adjacent pick-up means, as well as independently thereof.

I claim:

1. A plant-transferring apparatus for transferring at least one plug having a plant incorporated therein, comprising a supporting device on which said at least one plug is located, a feed means for moving said at least one plug located on the supporting device in a substantially horizontal direction, a pick-up means for seizing said at least one plug from its top side and moving it, said pick-up means including a plurality of needles oriented substantially vertically, each needle having a sharp end which points downwardly, a means for moving said needles simultaneously in a substantially vertical direction between a first extreme position in which the needles are at least partially inserted into said at least one plug, and a second extreme position in which said at least one plug is suspended above the supporting device such that said at least one plug is movable in a substantially horizontal direction above the supporting device, and a plant-flattening means located upstream of the needles with respect to the direction of movement of said at least one plug.

2. The plant-transferring apparatus according to claim 1, wherein the plant-flattening means comprises a movable sweeping strip, a bottom side of the movable sweeping strip being movable to a position substantially flush with a top side of said at least one plug.

3. The plant-transferring apparatus according to claim 2, wherein the sweeping strip is a brush.

4. The plant-transferring apparatus according to claim 3, wherein the apparatus further comprises a plug retainer, the plug retainer comprising an abutting face on its bottom side, the abutting face being substantially horizontal, and said plug retainer being movable along the length of the needles between a top position and a bottom position, in said top position the needles being extended substantially under the plug retainer, and in said bottom position the abutting face being located close to the sharp ends of the needles.

5. The plant-transferring apparatus according to claim 4, wherein the needles are fixed in a substantially tubular needle holder, and wherein the plug retainer is mounted on a shaft that extends through the needle holder and is movable relative to the needle holder.

6. The plant-transferring apparatus according to claim 5, wherein the abutting face comprises a first and a second part, one end of the first and one end of the second part being linked together at an angle relative to each other, the first part and the second part extending at a distance from a center line of the needle holder.

7. The plant-transferring apparatus according to claim 6, wherein the needle holder incorporates at least three of said plurality of needles disposed substantially parallel to the center line of the needle holder, and wherein the abutting face is located on the outside and along two adjacent sides of a polygon defined by the needles.

8. The plant-transferring apparatus according to claim 7 wherein the apparatus further comprises a pressure exerting means for adjusting the distance between the free ends of the needles placed in said at least one plug.

9. The plant-transferring apparatus according to claim 8, wherein the pressure exerting means comprises a clamping part, said clamping part being movable along the needles between a first and a second position, the needles extending substantially vertically when the clamping part is in the second position, and slightly obliquely when the clamping part is in the first position.

10. The plant-transferring apparatus according to claim 9, wherein the pick-up means further comprises a push-out pin, the push-out pin being substantially parallel to the needles and simultaneously exerting a push-out force on the bottom side of said at least one plug over substantially the entire vertical path traversed by said at least one plug when the needles are moved upward.

11. The plant-transferring apparatus according to claim 10 comprising a plurality of pick-up means, the movements of the pick-up means being synchronized.

* * * * *

UNITED STATES PATENT AND TRADEMARK OFFICE
CERTIFICATE OF CORRECTION

PATENT NO. : 5,536,281
DATED : July 16, 1996
INVENTOR(S) : Lambert Flier

It is certified that error appears in the above-indentified patent and that said Letters Patent is hereby corrected as shown below:

On the title page, under item [19], change "Lambert" to --Flier--.

On the title page, item [75], change "Flier Lambert" to --Lambert Flier--.

Signed and Sealed this

Twenty-ninth Day of October 1996

Attest:

BRUCE LEHMAN

Attesting Officer

Commissioner of Patents and Trademarks